United States Patent
Stainvas Olshansky et al.

(10) Patent No.: US 10,234,553 B2
(45) Date of Patent: Mar. 19, 2019

(54) DOPPLER-BASED COMPRESSION OF IMAGING RADAR DATA

(71) Applicant: GM Global Technology Operations LLC, Detroit, MI (US)

(72) Inventors: Inna Stainvas Olshansky, Modiin (IL); Igal Bilik, Rehovot (IL); Oded Bialer, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 781 days.

(21) Appl. No.: 14/855,480

(22) Filed: Sep. 16, 2015

(65) Prior Publication Data
US 2016/0084955 A1    Mar. 24, 2016

Related U.S. Application Data

(60) Provisional application No. 62/052,700, filed on Sep. 19, 2014.

(51) Int. Cl.
*G01S 13/58*    (2006.01)
*G01S 13/89*    (2006.01)
*G01S 13/93*    (2006.01)

(52) U.S. Cl.
CPC .............. *G01S 13/89* (2013.01); *G01S 13/58* (2013.01); *G01S 13/93* (2013.01)

(58) Field of Classification Search
CPC .......... G01S 13/58–13/64; G01S 13/89; G01S 13/93; H04N 19/00–19/99
See application file for complete search history.

(56) References Cited

U.S. PATENT DOCUMENTS

| | | | | |
|---|---|---|---|---|
| 5,390,133 A | * | 2/1995 | Sohie | G01S 3/7865 342/159 |
| 5,557,684 A | * | 9/1996 | Wang | G06K 9/38 348/E5.066 |
| 5,845,004 A | * | 12/1998 | Banjanin | G01S 7/52071 382/128 |
| 6,111,979 A | * | 8/2000 | Katto | G06T 9/001 382/154 |
| 8,068,544 B2 | * | 11/2011 | Roman | H04N 19/59 375/240.17 |
| 8,537,898 B2 | * | 9/2013 | Roman | H04N 19/59 375/240.17 |
| 8,666,120 B2 | * | 3/2014 | Chen | H04N 7/0137 348/154 |
| 8,891,831 B2 | * | 11/2014 | Chen | H04N 7/0137 348/154 |
| 2007/0280507 A1 | * | 12/2007 | Murali | G01P 5/001 382/107 |
| 2008/0279282 A1 | * | 11/2008 | Kobayashi | H04N 19/176 375/240.24 |

* cited by examiner

*Primary Examiner* — Matthew M Barker
(74) *Attorney, Agent, or Firm* — Cantor Colburn LLP

(57) ABSTRACT

A method for processing a sequence of images is provided. The method receives a sequence of images. Each image includes a plurality of pixels. The pixels include radial velocity information. The method compresses the sequence of images based on the radial velocity information. The method stores the compressed sequence of images in a storage device.

14 Claims, 3 Drawing Sheets

DOPPLER-BASED COMPRESSION OF IMAGING RADAR DATA

CROSS-REFERENCE TO RELATED APPLICATION

This application is a Non-Provisional of U.S. Provisional Patent Application Ser. No. 62/052,700 filed Sep. 19, 2014, the disclosure of which is incorporated by reference herein in its entirety.

FIELD OF THE INVENTION

The subject invention relates to processing a sequence of images and, more specifically, using radial velocity information of the pixels of the images in the sequence to compress the sequence of images.

BACKGROUND

The images generated by a high-resolution imaging radar may carry much more information than the images generated by a conventional radar system or the images generated by a conventional camera system. That is, the size of data for an image generated by a high-resolution imaging radar is often much larger than the size of an image generated by a conventional radar system or a conventional camera system. Images with larger sizes take longer to process, store, or transmit because of the sizes. Accordingly, it is desirable to provide methods and systems that compress the images generated by a high-resolution imaging radar for faster processing of the images and for smaller storage spaces to store the images.

SUMMARY OF THE INVENTION

In one exemplary embodiment of the invention, a method for processing a sequence of images is provided. The method receives a sequence of images. Each image includes a plurality of pixels. Each pixel includes radial velocity information. The method compresses the sequence of images based on the radial velocity information. The method stores the compressed sequence of images in a storage device.

In another exemplary embodiment of the invention, a system for processing a sequence of images is provided. The system comprises a radar configured to generate a sequence of images. Each image includes a plurality of pixels and each pixel includes radial velocity information. The system further comprises an encoder configured to compress the sequence of images based on the radial velocity information. The system comprises a storage device configured to store the compressed sequence of images.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
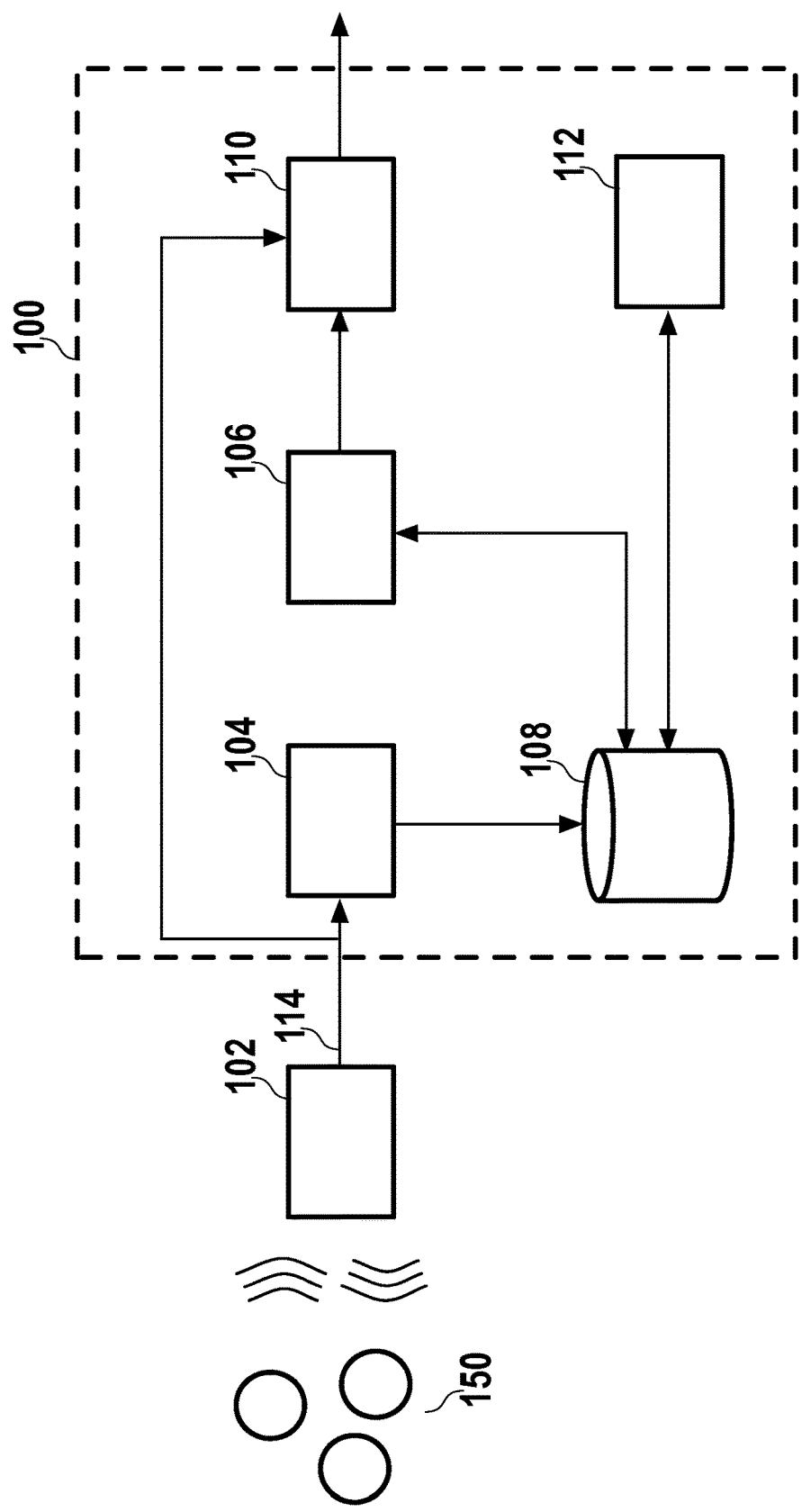
FIG. 1 depicts a radar and an image processing system in accordance with embodiments of the invention.

The following description is merely exemplary in nature and is not intended to limit the present disclosure, its application or uses. It should be understood that throughout the drawings, corresponding reference numerals indicate like or corresponding parts and features.

As discussed above, the images generated by a high-resolution imaging radar may carry more information than the images generated by a conventional radar system or the images generated by a conventional camera system. This is because an object shown in an image generated by a high-resolution imaging radar is represented by a larger number of pixels showing more details of the object while an object shown in an image generated by a conventional radar system is a lower resolution image where a smaller number of pixels (e.g., a dot) may represent the object. Moreover, an image generated by a high-resolution imaging radar carries more information than an image generated by a conventional camera system because a conventional camera system does not have radial velocity information for the pixels in the image.

In embodiments, an image generated by a high-resolution imaging radar includes radial velocity information in addition to range information, elevation information, azimuth information, and intensity information, which an image generated by a conventional radar includes. Specifically, in embodiments, every pixel in an image generated by a high-resolution image radar includes radial velocity information, range information, elevation information, azimuth information and intensity information. The radial velocity information for a pixel indicates a radial velocity of the pixel measured by the radar based on a motion of an object relative to the radar. The range information for a pixel indicates a distance between the object and the radar. The elevation information indicates an elevation angle from the radar to the object. The azimuth information indicates an azimuth angle from the radar to the object. The intensity information indicates a magnitude and a phase of a radar signal reflected by the object. Generally speaking, the methods and systems of the embodiments of the invention use the radial velocity information for a pixel in an image, in order to compress the sequence of images.

In accordance with an exemplary embodiment of the invention, FIG. 1 depicts an image processing system 100 and a radar 102. In embodiments, the image processing system 100 includes one or more modules and sub-modules such as an encoder 104, a decoder 106, a datastore 108, a processing module 110 and a transceiver 112. As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 1 may be combined and/or further partitioned. In embodiments, the image processing system 100 and the radar 102 operates in a vehicle or mobile platform. Non-limiting embodiments of the vehicle or mobile platform include manned or unmanned land-craft, manned or unmanned watercraft, manned or unmanned aircraft, and manned or unmanned spacecraft.

The radar 102 generates high-resolution images (or frames) of the environment around the image processing system 100. The radar 102 captures sequential images 114 of radar data, which are passed to the encoder 104 or to the processing module 110 for image processing and analysis. In embodiments, the radar 102 is configured to perform a Doppler analysis on one or more moving objects 150 that may be present in the range of the radar 102 to generate radial velocity information for each pixel of an image that the radar 102 captures. The radar 102 also generates range information, elevation information, and azimuth information for each pixel of the image, in addition to the radial velocity information. Moreover, the radar 102 generates intensity information for each pixel that indicates one or more intensity values of the pixel. In embodiments, the intensity information is in the form of a complex number to indicate the magnitude and the phase of the reflected radar signal.

The encoder 104 compresses the sequence of images 114 received from the radar 102 to reduce the data size of the sequence of images. In embodiments, the encoder 104 uses the radial velocity information for a pixel in an image, in order to compress the sequence of images. Specifically, for each pixel of an image in the sequence, the encoder 104 uses the radial velocity information to identify a location of another pixel in another image of the sequence that corresponds to the pixel. The encoder 104 reduces the data size of each pixel in an image based on the corresponding pixel in another image. With the identified location of the corresponding pixel, the encoder 104 generates a vector that points to the location of the corresponding pixel (e.g., the image identifier or a frame number of the image that contains the corresponding pixel, the coordinates of the corresponding pixel within the image, etc.). The encoder 104 replaces the intensity information of the pixel with the vector and a difference in intensities between the pixel and the corresponding pixel. Because a vector and an intensity difference have much smaller data sizes than the intensity information of the pixel does, a reduction in the data size of the pixel is achieved. Moreover, the encoder 104 may also compress the radial velocity information itself in order to reduce the data size of the pixel. The encoder 104 stores the compressed sequence of images in the datastore 108. More details about the encoder 104 will be described further below by reference to FIG. 2.

The transceiver 112 may access the compressed sequence of images in the datastore 108 to transmit the compressed sequence of images to a remote system (e.g., another vehicle, a remote telematics server, a cloud system, etc.) through one or more networks (not shown). The transceiver 112 also receives a compressed sequence of images from a remote system through one or more networks and stores these images in the datastore 108.

The decoder 106 may access the compressed sequence of images stored in the datastore 108 to decompress the images. As mentioned above, the compressed sequence of images may be generated by the encoder 104 or received from a remote system by the transceiver 112. For a pixel in an image in the compressed sequence of images, the decoder 106 uses a vector for a pixel to locate a corresponding pixel in the same image or in another image and adds the intensity difference for the pixel and an intensity value of the corresponding pixel to restore the intensity value of the pixel. More details about the decoder 106 will be described further below by reference to FIG. 2.

The processing module 110 processes the uncompressed sequence of images received from the decoder 106. For instance, the processing module 100 analyzes the uncompressed images to identify and locate any object in the images.

Figure 2:
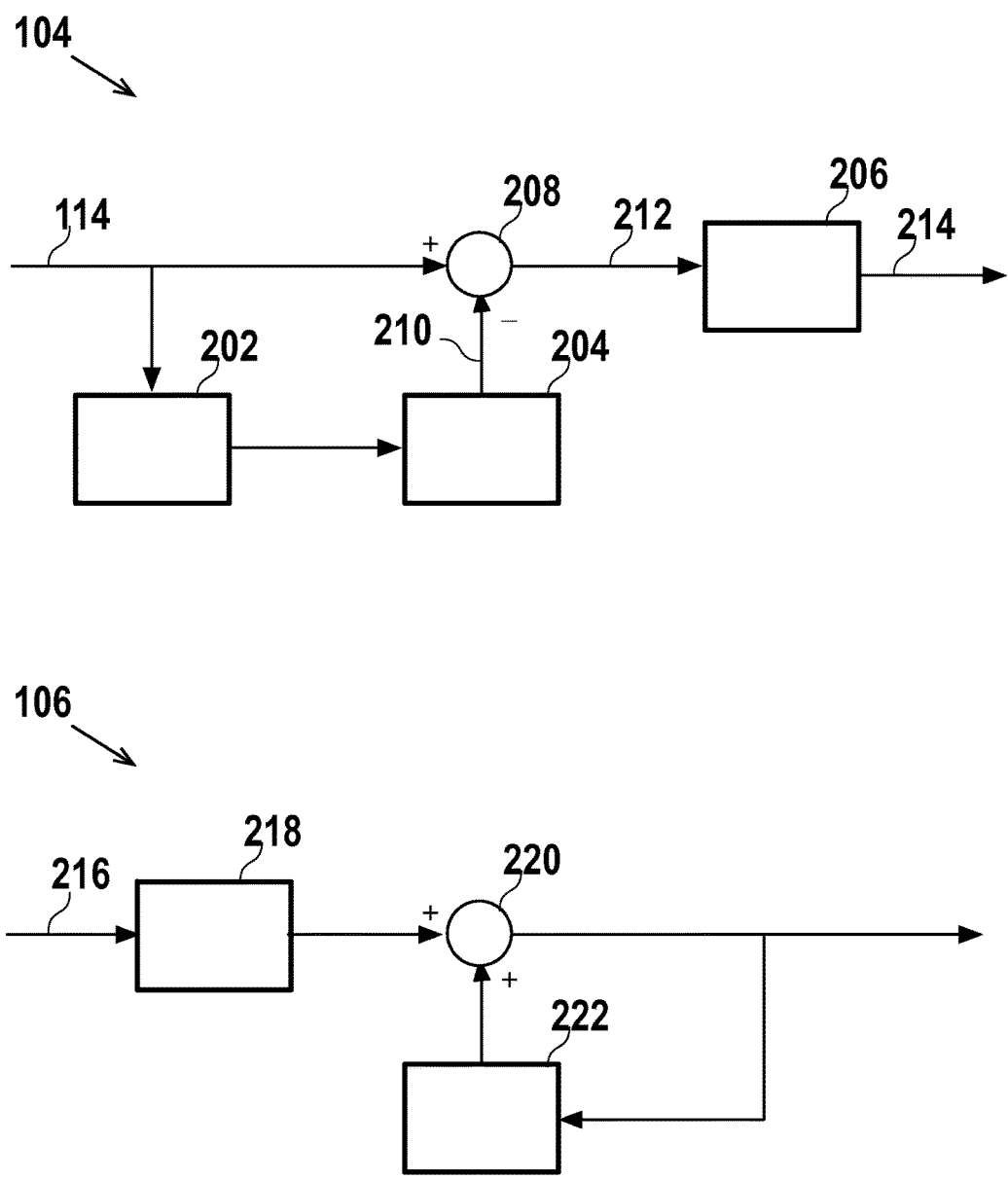
FIG. 2 depicts a block diagram of an encoder and a decoder in accordance with embodiments of the invention.

FIG. 2 depicts a block diagram of the encoder 104 and the decoder 106 of FIG. 1. Specifically, the top half of FIG. 2 illustrates the encoder 104, and the bottom half of FIG. 2 illustrates the decoder 106. In embodiments, the encoder 104 includes one or more sub-modules such as a predictor 202, a quantizer 204, a subtractor 208 and a symbol encoder 206.

The predictor 202 receives the sequence of images 114 from the radar 102 (not shown in FIG. 2). The predictor 202 performs an inter-image predictive encoding (i.e., temporal encoding). That is, for each particular pixel of a particular image in the sequence 114, the predictor 202 identifies a location of another image within the sequence that may include a corresponding pixel. For instance, the predictor 202 determines a time gap between each two consecutive images in the sequence based on a frame rate at which the radar 102 captured the images and uses these time gaps and the radial velocity information of the pixel to identify a location of the other image within the sequence. The predictor 202 then identifies a pixel of the identified image that has a similar intensity value(s) as the corresponding pixel.

In embodiments, the predictor 202 may also perform an intra-image predictive encoding (i.e., spatial encoding) using the radial velocity information of the particular pixel. That is, the predictor 202 may identify a corresponding pixel within the particular image using the radial velocity information of the particular pixel. For instance, the predictor 202 may identify a set of other pixels within the particular image that has similar radial velocity information and identify a pixel in the set that has similar intensity value(s) as the corresponding pixel.

In embodiments, the predictor 202 may identify a group of corresponding pixels for a group of adjacent pixels of the particular image using the radial velocity information for the group of pixels. That is, in these embodiments, the predictor 202 performs a predictive encoding on a per-pixel group basis rather than on a per-pixel basis. In embodiments, a group of pixels is a minimum coded unit (MCU) block (e.g., 8 by 8, 16 by 8, or 16 by 16 pixels) for the predictor 202. In embodiments, a group of pixels that the predictor 202 processes is a macroblock.

For each particular pixel or pixel group of a particular image in the sequence, the predictor 202 generates a vector pointing to the corresponding pixel or pixel group. This vector indicates the location of an image (i.e., the particular image or another image in the sequence) containing the corresponding pixel or pixel group as well as the location of the pixel or pixel group within that image.

The quantizer 204 rounds up the intensity values of the corresponding pixels to the nearest integers. The subtractor 208 subtracts these round-up intensity values 210 from the intensity values of the pixels in the sequence of images 114 to compute the intensity differences at 212, which are supplied to the symbol encoder 206. In embodiments, the quantizer 204 quantizes the intensity differences at 212 in addition to or instead of quantizing the intensity values of the pixels.

Likewise, in embodiments, the quantizer 204 rounds up the radial velocity values (i.e., both the magnitude and phase values) of the corresponding pixels to the nearest integers. The subtractor 208 subtracts these round-up radial velocity values 210 from the radial velocity values of the pixels in the sequence of images 114 to compute the radial velocity intensity differences 212, which are supplied to the symbol encoder 206. In embodiments, the quantizer 204 quantizes the radial velocity differences at 212 in addition to or instead of quantizing the radial velocity values of the pixels.

In embodiments, the symbol encoder 206 performs an entropy encoding (e.g., Huffman coding, arithmetic coding, etc.) on the intensity and radial velocity differences at 212 to further reduce the data size of each image in the sequence. The output 214 of the symbol encoder 206 represents the compressed sequence of images.

As can be recognized, a predictor, a quantizer and a symbol encoder are common components of conventional video encoding systems for compressing a sequence of images. Other features of a predictor, a quantizer and a symbol encoder of the conventional video encoding systems are known and therefore are not described in this disclosure for simplicity of description and illustration. For instance, a discrete cosine transformation (DCT) that may be performed on the pixels of the images in the sequence is not described. However, in contrast to a predictor of the conventional video encoding systems, the predictor 202 performs a predictive encoding by using the radial velocity information. Moreover, in contrast to a symbol encoder of the conventional video encoding systems, the symbol encoder 206 performs an entropy encoding on the radial velocity information of the pixels. As such, the image processing system 100 may employ one or more conventional video compression techniques by adapting or modifying the techniques to utilize the radial velocity information of the pixels of the images in the sequence. Examples of the conventional video compression techniques include MPEG (Moving Picture Experts Group) and HEVC (High Efficiency Video Coding) techniques specified in H.261, H.263, H.264, or H.265 standards.

In the bottom half of FIG. 2 is shown the decoder 106 which, in embodiments, includes a symbol decoder 218, an adder 220, and a predictor 222. As mentioned above, the decoder 106 retrieves a compressed sequence of images (e.g., a compressed sequence of images 216) from the datastore 108 (not shown in FIG. 2). The compressed sequence of images may have been compressed by the encoder 104 or may originate from a remote system (not shown in FIG. 2). The decoder 106 undoes or reverses the encoding processes that an encoder (e.g., the encoder 104) performed on a sequence of images, in order to decompress the compressed sequence of images.

The symbol decoder 218 performs an entropy decoding (e.g., Huffman coding, arithmetic coding, etc.) on the compressed sequence of images 216. The compressed sequence of images 216 may include entropy-encoded differences between the original intensity and radial velocity values of pixels in the images and the intensity and radial velocity values of the corresponding pixels. Therefore, the output of the symbol decoder 218 is the intensity and radial velocity differences.

For each pixel or each pixel group, the predictor 222 determines the intensity and radial velocity values of the corresponding pixel group, using a vector that indicates the location of an image within the sequence that includes the corresponding pixel or pixel group as well as the location of the corresponding pixel or pixel group. The adder 220 adds the intensity and radial velocity differences and the intensity and radial velocity values of the corresponding pixel or pixel group to restore the intensity and radial velocity values of the pixel or pixel group. As such, an uncompressed sequence of images is outputted from the decoder 106.

Figure 3:
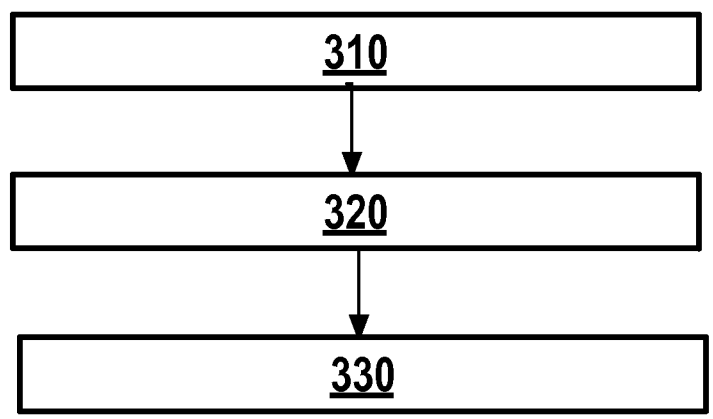
FIG. 3 is a flowchart illustrating a method for processing a sequence of images in accordance with embodiments of the invention.

Referring now to FIG. 3, and with continued reference to FIGS. 1 and 2, a flowchart illustrates a method for compressing a sequence of images. In embodiments, the method can be performed by the image processing system 100 of FIGS. 1 and 2. As can be appreciated in light of the disclosure, the order of operation within the method is not limited to the sequential execution as illustrated in FIG. 3, but may be performed in one or more varying orders as applicable and in accordance with the present disclosure. In embodiments, the method can be scheduled to run based on predetermined events, and/or run continually during operation of the image processing system 100.

At block 310, the image processing system 100 receives a sequence of images from the radar 102. The sequence of images includes radial velocity information, range information, elevation information, azimuth information, and intensity information generated by the radar 102 for each pixel of an image in the sequence.

At block 320, the image processing system 100 compresses the sequence of images based on the radial velocity information. Specifically, for each particular pixel or pixel group in a particular image in the sequence, the image processing system 100 uses the radial velocity information of the pixel or the pixel group to identify a location of another image within the sequence that may include a corresponding pixel or a corresponding pixel group. The image processing system 100 then identifies a pixel or a pixel group of the identified image that has similar intensity values as the corresponding pixel or the corresponding pixel group. The image processing system 100 may also identify a corresponding pixel or a corresponding pixel group within the particular image using the radial velocity information of the particular pixel or the particular pixel group. The image processing system 100 determines the differences between the intensity values of the particular pixel or the particular pixel group and the intensity values of the corresponding pixel or the corresponding pixel group. The image processing system 100 also determines the differences between the radial velocity values of the particular pixel or the particular pixel group and the radial velocity values of the corresponding pixel or the corresponding pixel group. The image processing system 100 quantizes the intensity and radial velocity differences by, for example, rounding up the intensity and radial velocity differences to the nearest integers. The image processing system 100 then performs an entropy encoding on the intensity and radial velocity differences.

At block 330, the image processing system 100 stores the compressed sequence of images in the datastore 108. In some cases, the image processing system 100 transmits the compressed sequence of images to a remote system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A computer-implemented method for processing a sequence of images, comprising:

capturing the sequence of images using a radar;

receiving the sequence of images, each image including a plurality of pixels, each of the pixels including radial velocity information;

compressing, by a computer, the sequence of images based on the radial velocity information to generate a compressed sequence of images; and storing the compressed sequence of images in a storage device, wherein the compressing the sequence of images comprises one of compressing the radial velocity information or identifying one set of pixels in one image in the sequence of images, identifying a location of another set of pixels in another image in the sequence of images based on the radial velocity information of the one set of pixels, and compressing the one set of pixels based on the other set of pixels.

2. The method of claim 1, further comprising identifying a location of the other image within the sequence of images based on the radial velocity information of the one set of pixels based on the compressing the sequence of images comprising compressing the one set of pixels based on the other set of pixels.

3. The method of claim 1, wherein the radial velocity information indicates a radial velocity of the pixel measured by the radar based on a motion of an object relative to the radar.

4. The method of claim 3, wherein each pixel of the image further includes:
range information that indicates a distance between the object and the radar;
elevation information that indicates an elevation angle from the radar to the object;
azimuth information that indicates an azimuth angle from the radar to the object; and
intensity information that indicates a magnitude and a phase of a radar signal reflected by the object.

5. The method of claim 1, further comprising transmitting the compressed sequence of images to a remote system.

6. The method of claim 5, wherein the remote system is one of a vehicle, a telematics system and a cloud system.

7. The method of claim 1, further comprising:
receiving the compressed sequence of images, each compressed image including a plurality of pixels, each of the pixels further including compressed radial velocity information; and
decompressing the compressed sequence of images by decompressing the radial velocity information.

8. A system for processing a sequence of images, comprising:

a radar configured to generate the sequence of images, each image including a plurality of pixels, each of the pixels including radial velocity information;

an encoder configured to compress the sequence of images based on the radial velocity information to generate a compressed sequence of images; and a storage device configured to store the compressed sequence of images, wherein the encoder is configured to compress the sequence of images by one of compressing the radial velocity information, or identifying one set of pixels in one image in the sequence of images, identifying a location of another set of pixels in another image in the sequence of images based on the radial velocity information of the one set of pixels, and compressing the one set of pixels based on the other set of pixels.

9. The system of claim 8, wherein the encoder is further configured to identify a location of the other image within the sequence of images based on the radial velocity information of the one set of pixels based on the encoder being configured to compress the sequence of images by compressing the one set of pixels based on the other set of pixels.

10. The system of claim 8, wherein the radial velocity information indicates a radial velocity of the pixel measured by the radar based on a motion of an object relative to the radar.

11. The system of claim 10, wherein each pixel of the image further includes:
range information that indicates a distance between the object and the radar;
elevation information that indicates an elevation angle from the radar to the object;
azimuth information that indicates an azimuth angle from the radar to the object; and
intensity information that indicates a magnitude and a phase of a radar signal reflected by the object.

12. The system of claim 8, further comprising a transmitter configured to transmit the compressed sequence of images to a remote system.

13. The system of claim 12, wherein the remote system is one of a vehicle, a telematics system and a cloud system.

14. The system of claim 8, further comprising a decoder configured to:
receive the compressed sequence of images, each compressed image including a plurality of pixels, each of the pixels further including compressed radial velocity information; and
decompress the compressed sequence of images by decompressing the radial velocity information.

* * * * *